July 10, 1934.   R. L. WILCOX ET AL   1,966,056
FEED MECHANISM
Filed July 7, 1932   9 Sheets-Sheet 4
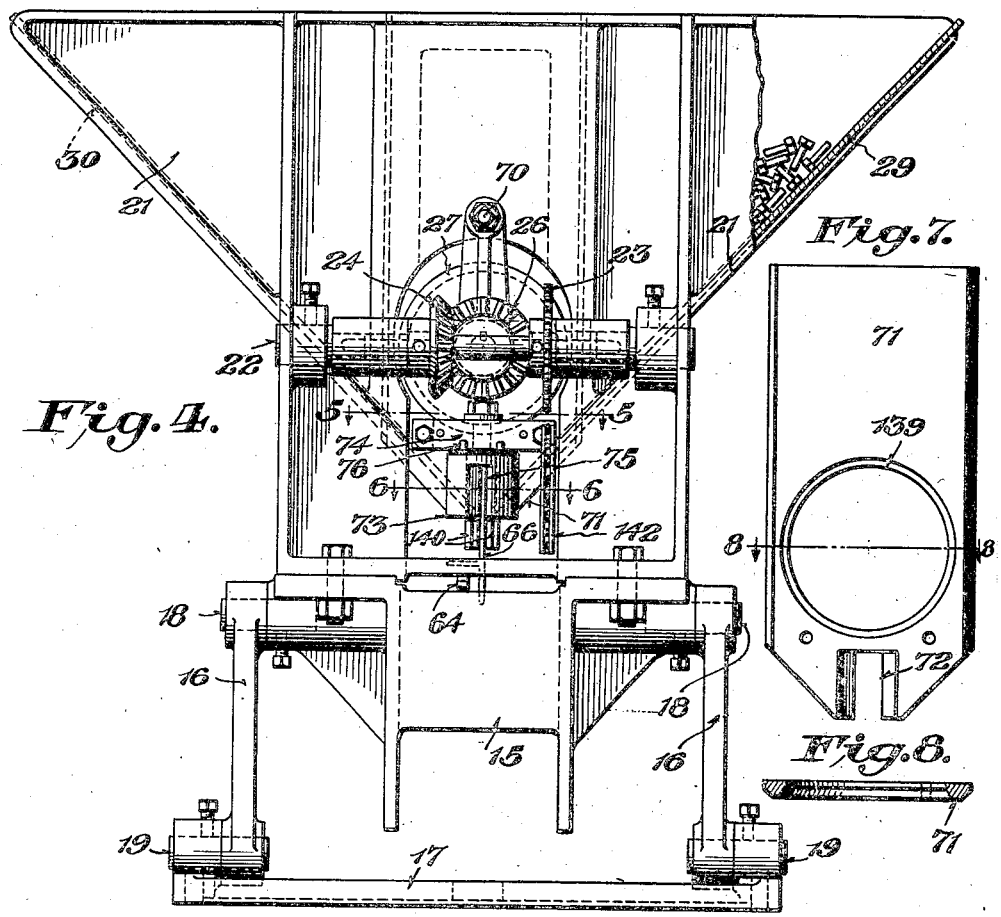
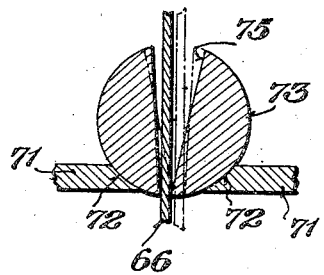
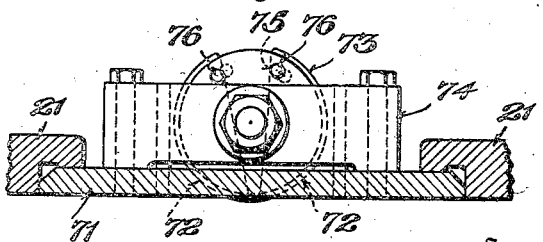
Inventors
Richard Lester Wilcox,
William D. Rigney,
By George G. Hall
Attorney

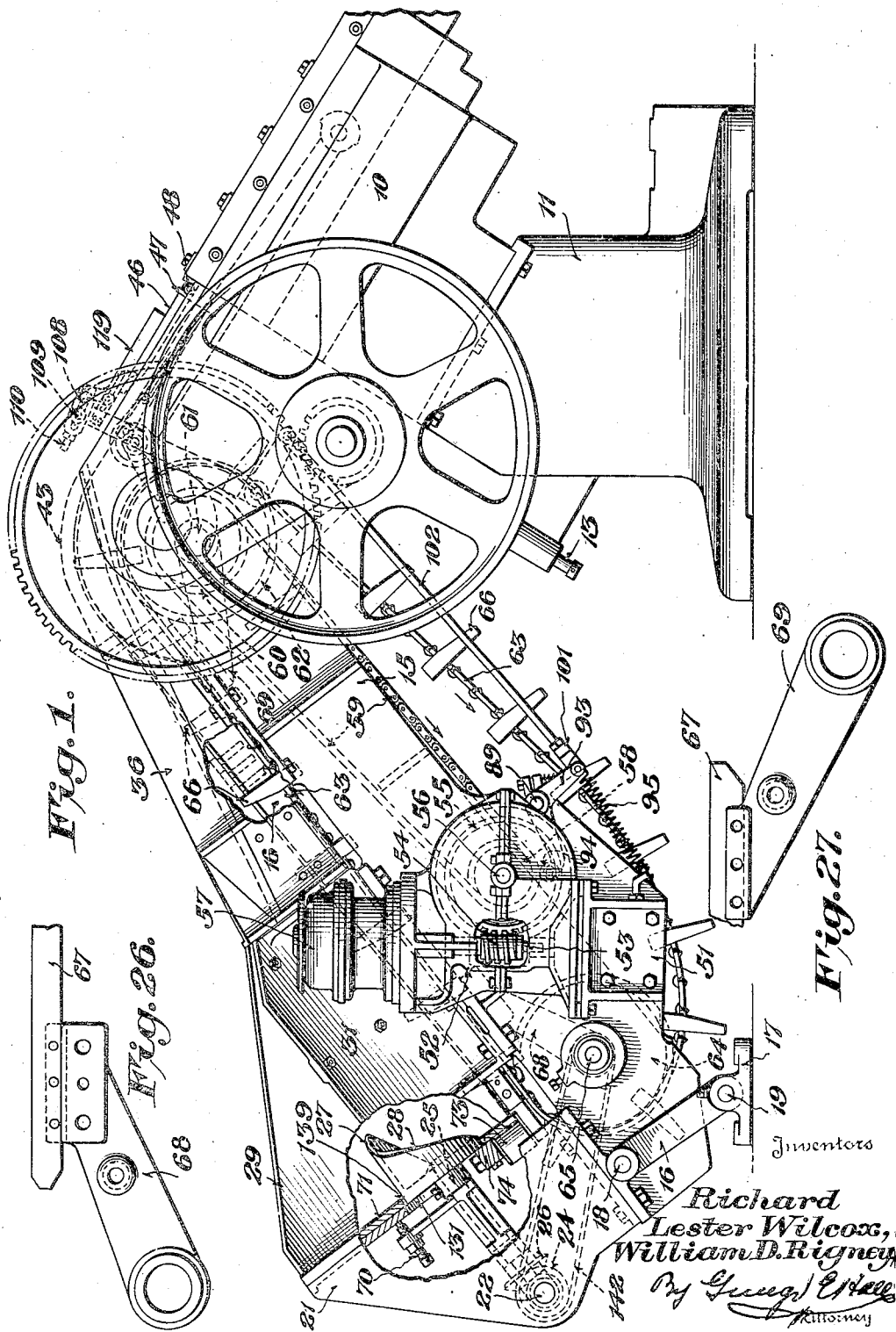

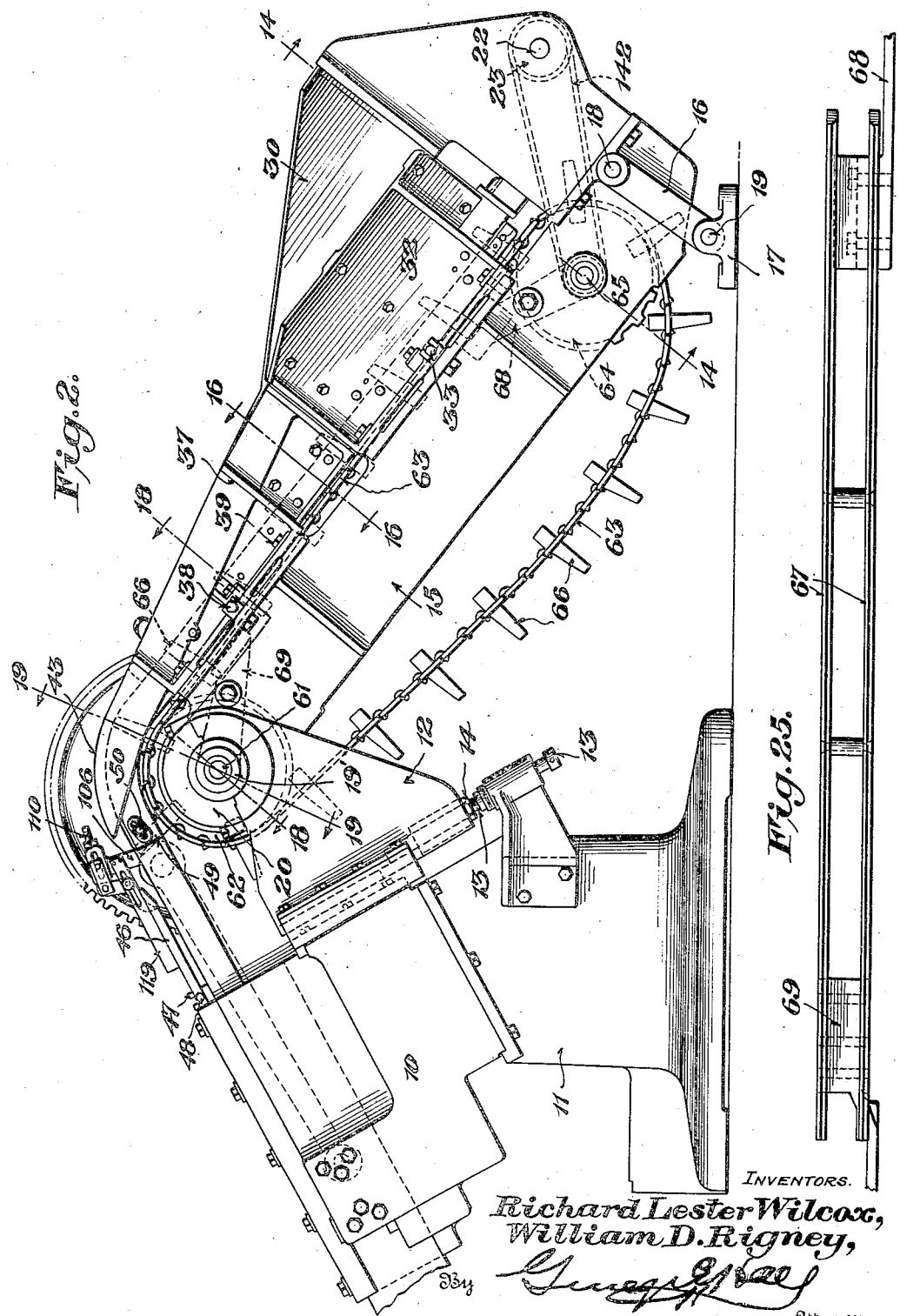

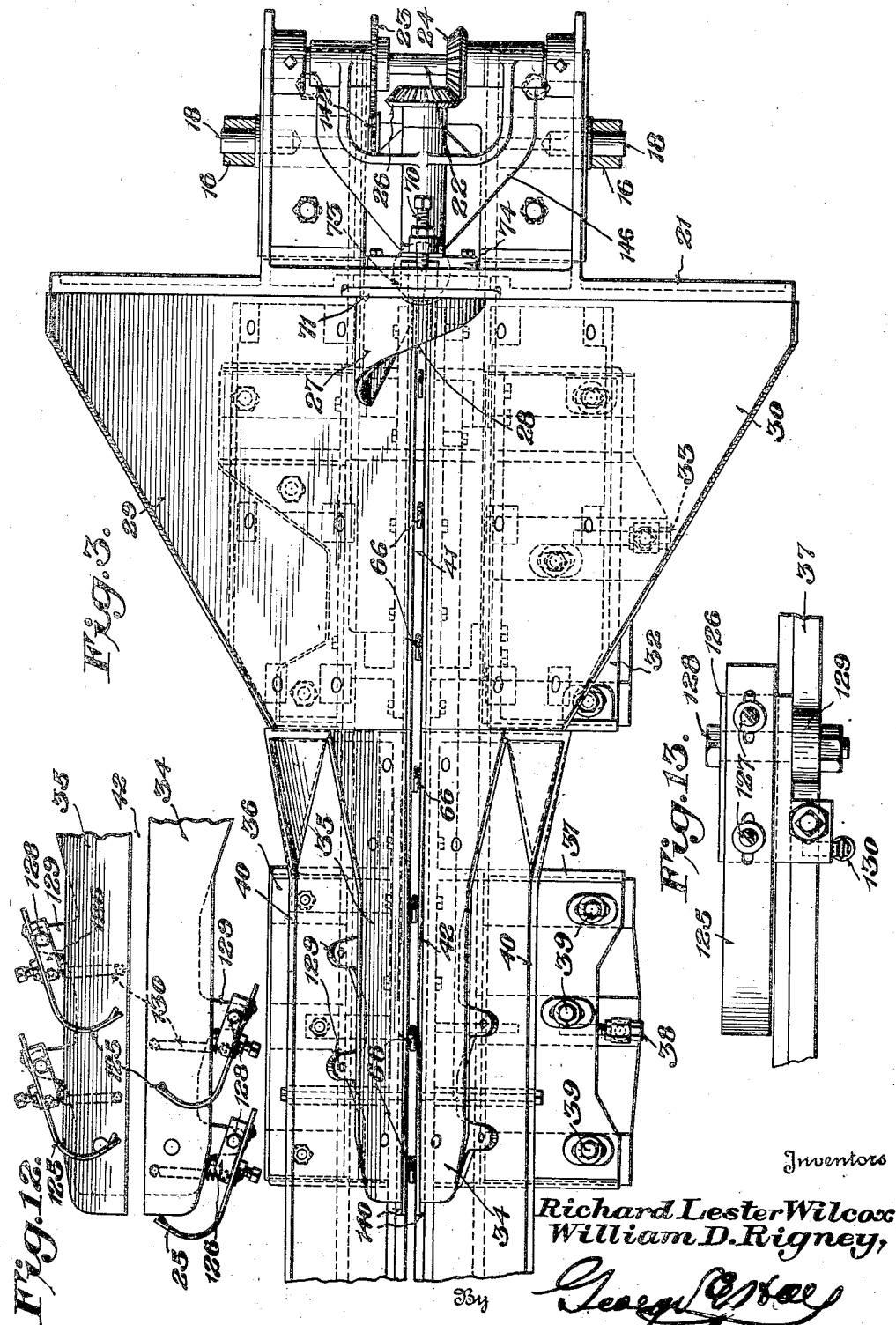

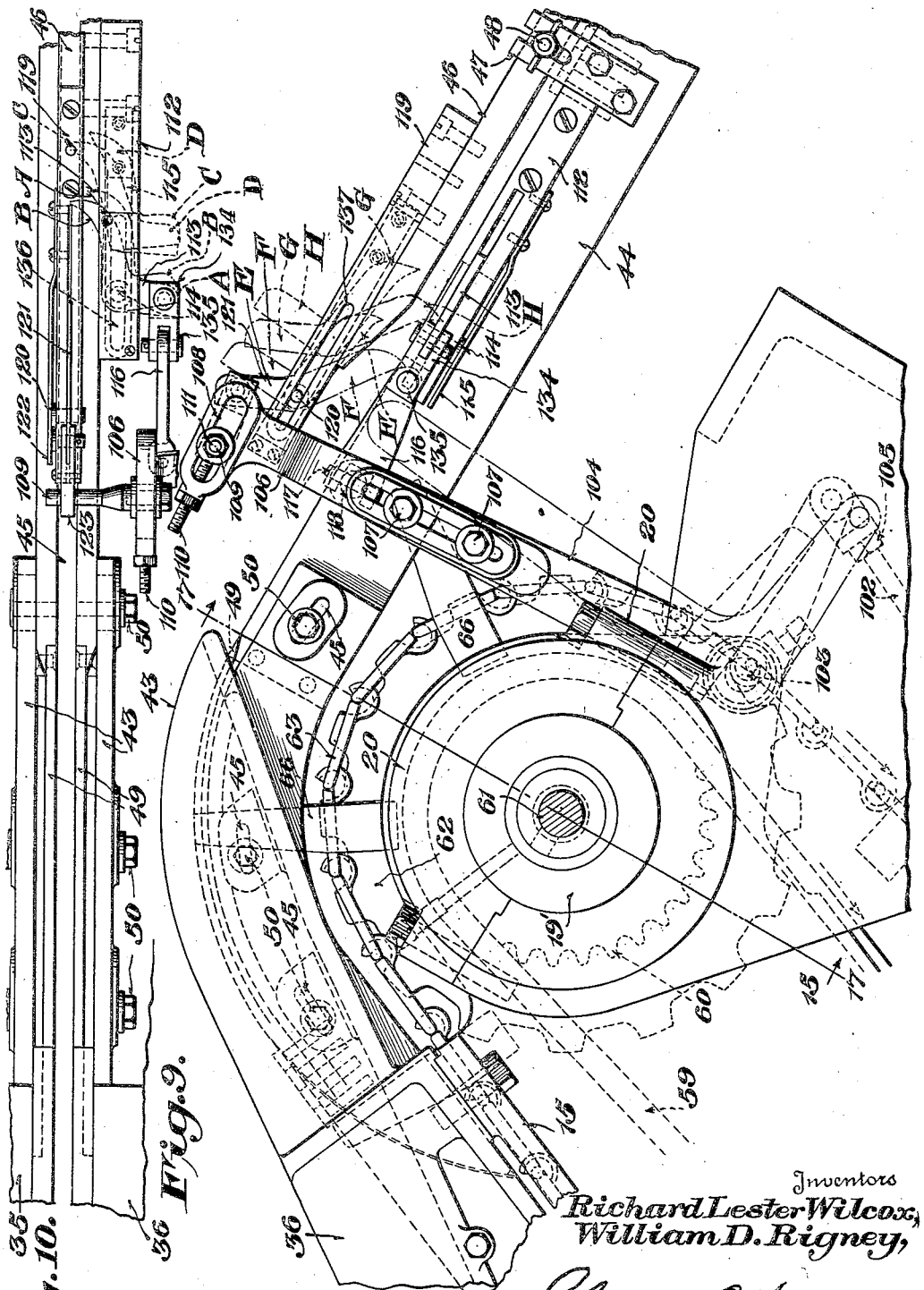

July 10, 1934.    R. L. WILCOX ET AL    1,966,056
FEED MECHANISM
Filed July 7, 1932    9 Sheets-Sheet 6
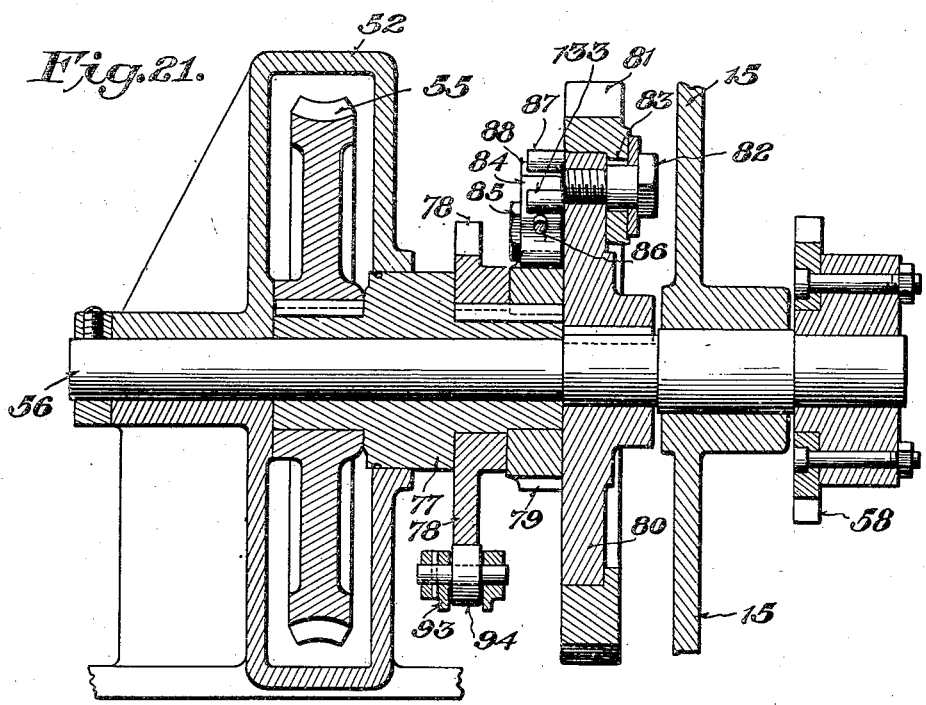
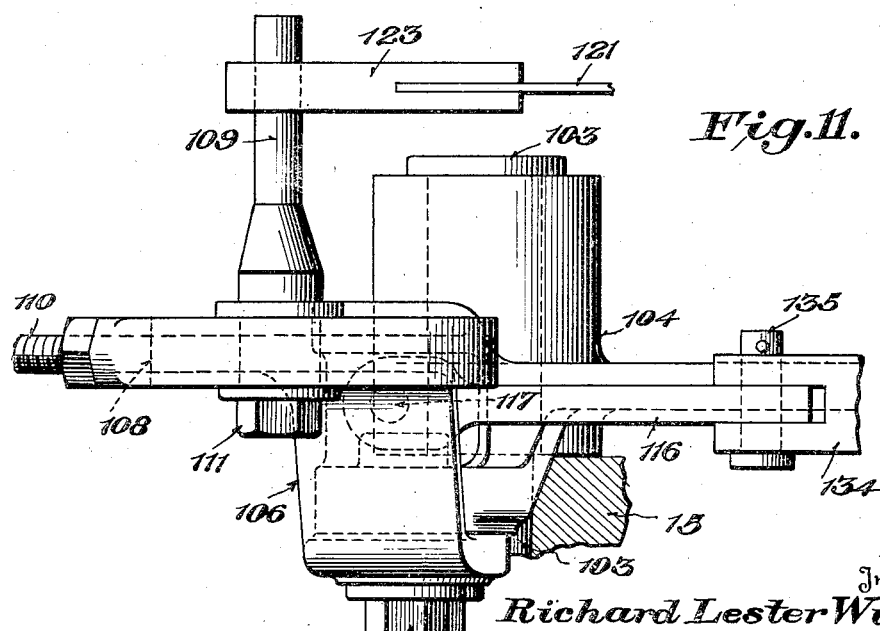
Inventors
Richard Lester Wilcox
William D. Rigney,
By George H. Hall
Attorney

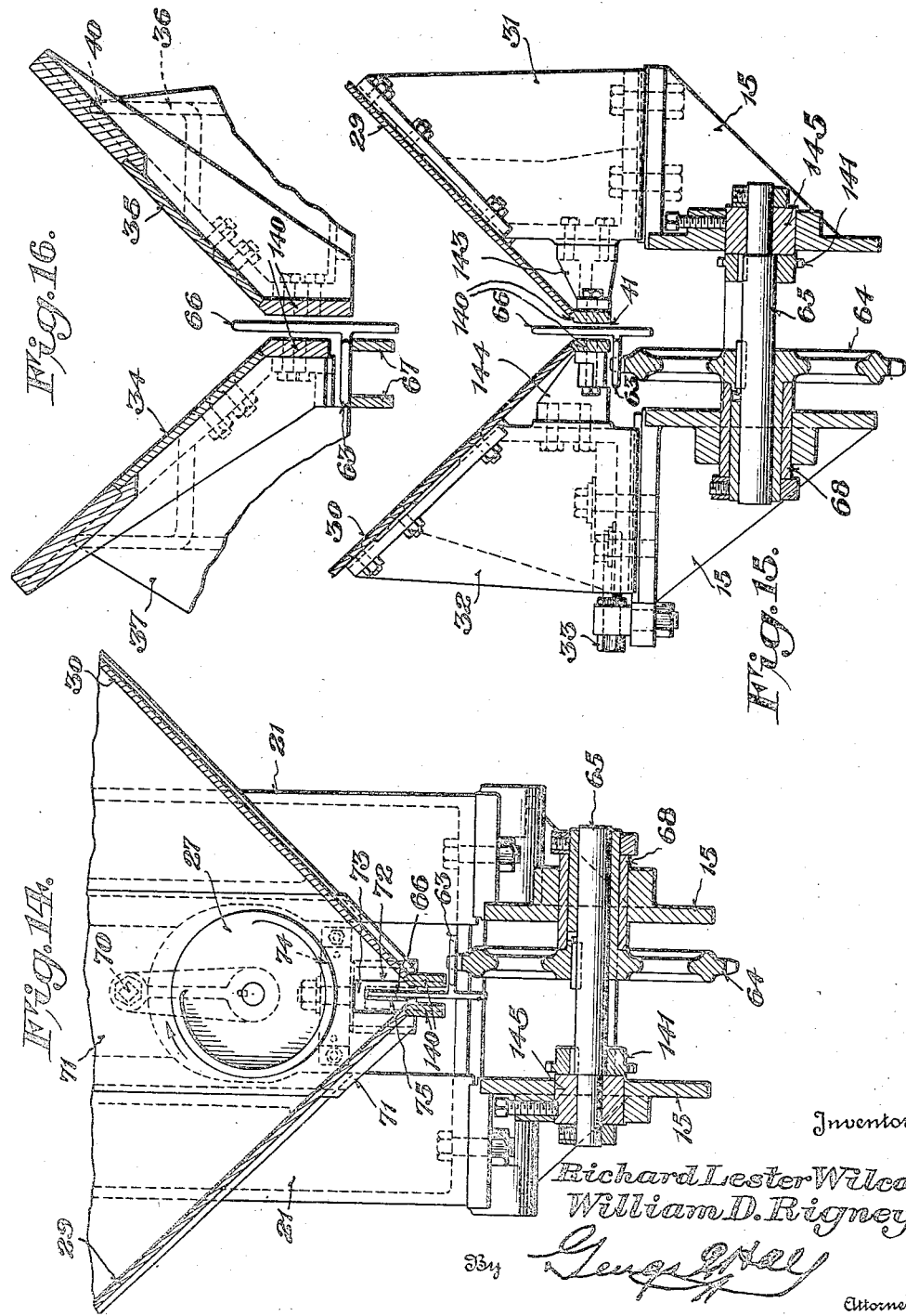

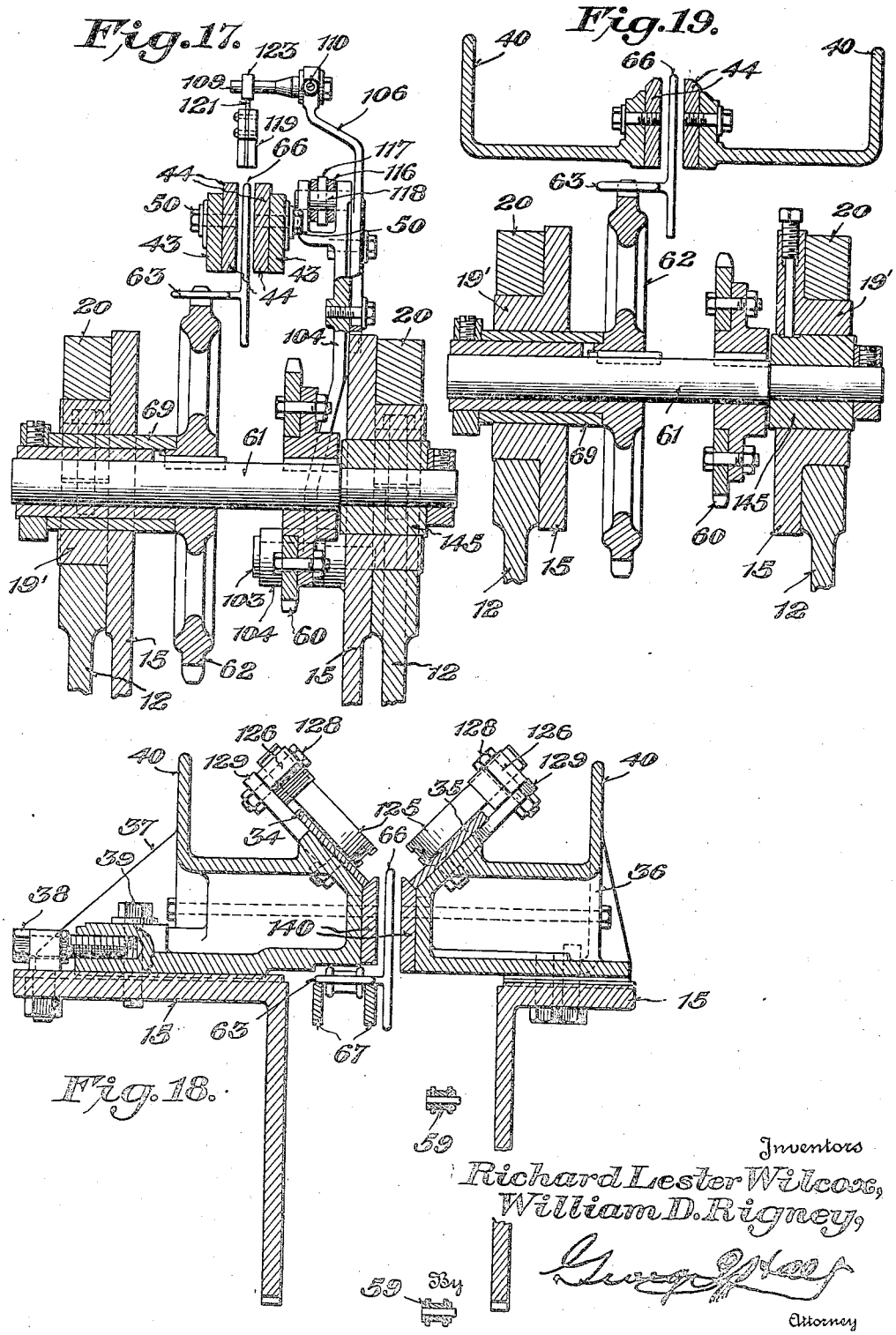

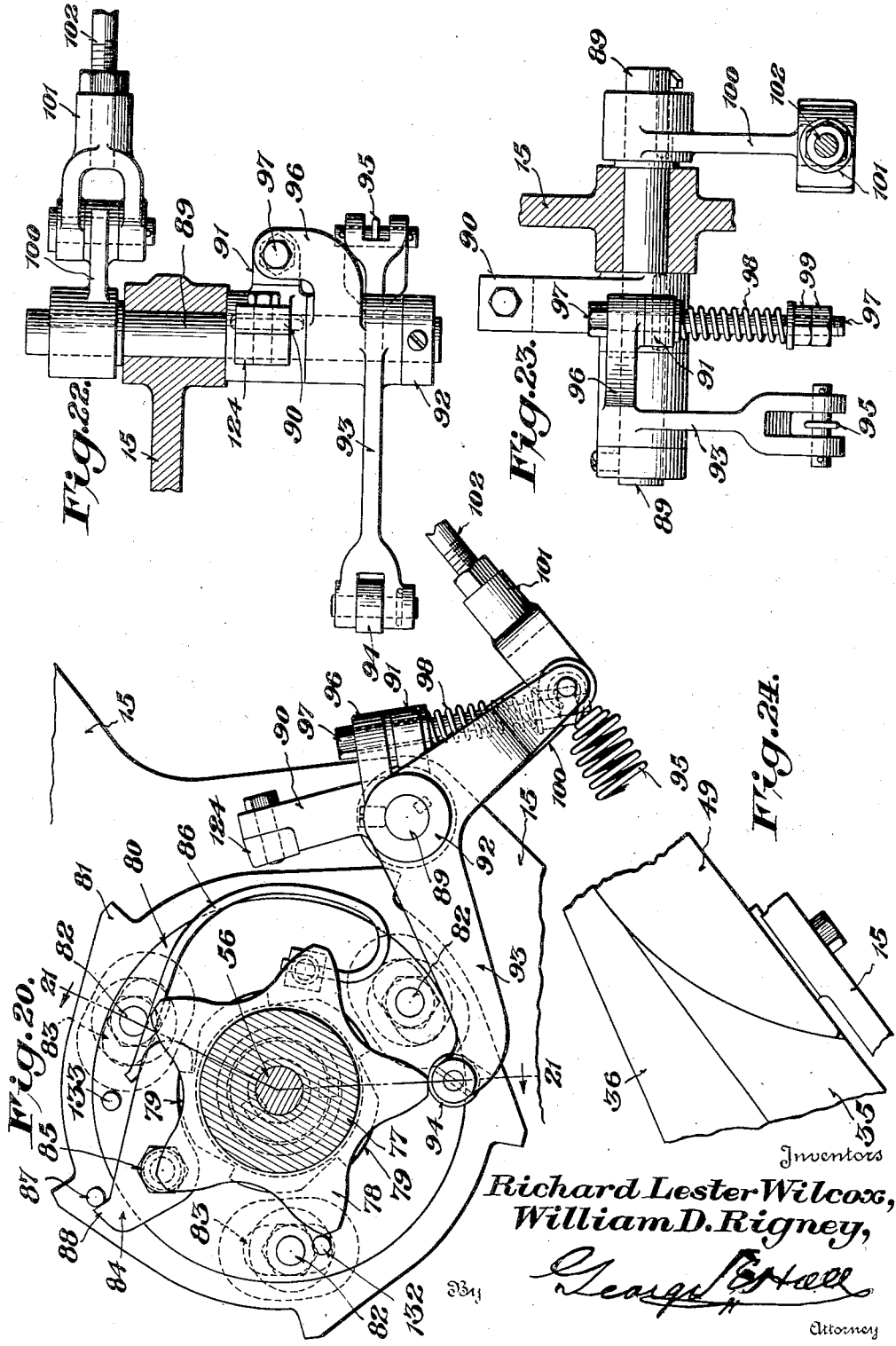

Patented July 10, 1934

1,966,056

UNITED STATES PATENT OFFICE 1,966,056

FEED MECHANISM

Richard Lester Wilcox, Waterbury, Conn., and William D. Rigney, Portchester, N. Y., assignors to Russell, Burdsall & Ward Bolt and Nut Company, Portchester, N. Y., a corporation of New York Application July 7, 1932, Serial No. 621,206

31 Claims. (Cl. 10—162)

This invention relates to new and improved feed mechanism, referring more particularly to a type thereof that holds an assembled mass of articles and from which such articles are successively taken and fed one by one to a delivery station, from which they are conveyed to a machine or device for operations thereon, or for any other purpose. As shown herein, for purpose of illustration, and not for limitation, the device is designed to deliver the blanks to a so-called threading machine.

In the mechanism herein disclosed, and within its capacity, the articles may vary greatly in both size and shape, such variation being accommodated by a minimum adjustment of parts to conform thereto. The articles are placed indiscriminately and en masse in a hopper, located at a low point. This position of the hopper facilitates the loading thereof, as the articles may be readily placed therein without the labor and additional mechanism usually required to lift the articles to a hopper when positioned as is usual at an elevation higher than the delivery station. In the hopper, so designed as to have a very large capacity, the massed articles are always visible, and are subjected to agitation by floating means, which accommodates itself to certain jammed groups of articles so as to avoid injury thereto. From this hopper the articles are lifted to a delivery point higher than the hopper and there discharged into a chute mechanism. Means are provided whereby the feed of further blanks is stopped if the chute is filled to a predetermined capacity or a blank or blanks disarranged thereon, thus the feed of blanks is only as required, and an over-feed or the feed of an out-of-alignment blank is impossible.

With this hopper and means for conveying articles therefrom, the latter are fed faster and more uniformly than heretofore possible, irrespective of whether the hopper is filled or approximately empty. As such conveying means comes to a full stop when the feed chute is filled or a blank is out of position therein, the articles are disturbed less than when the movement of the conveying means is constant, consequently are less liable to be moved or nicked and this mechanism is adapted for use for articles made of relatively soft material or highly finished.

The parts are so designed that the hopper and associated mechanism may be adjusted to accommodate varying positions of the chute or for other reasons, if the latter is changed to conform with that of the machine with which it is arranged.

To the above, and other ends, the invention consists in the new and improved feed mechanism, having certain details of construction and combinations of parts, as will be hereinafter described, and more particularly pointed out in the claims.

In the drawings, wherein like numerals of reference indicate like parts in the several figures;

Figure 1 is a view of one side of the machine;
Figure 2 is a view of the opposite side thereof;
Figure 3 is a fragmentary plan thereof;
Figure 4 is a fragmentary end view;
Figure 5 is a detail view of the adjustable slot mechanism, the parts in section being taken generally upon line 5—5 of Figure 4;
Figure 6 is a sectional view thereof, the parts in section being taken generally upon line 6—6 of Figure 4;
Figure 7 is an elevation of the hopper closure plate;
Figure 8 is a sectional view thereof upon line 8—8 of Figure 7;
Figure 9 is an enlarged fragmentary view of that portion of the machine adjacent to the feed chute;
Figure 10 is a fragmentary plan view thereof;
Figure 11 is a plan view of a portion of the trip mechanism;
Figures 12 and 13 are two views of the clearance fingers, with portions of the adjacent parts;
Figure 14 is a fragmentary elevation of some of the parts, those in section being taken generally upon line 14—14 of Figure 2;
Figure 15 is a similar view, with the parts in section, being taken generally upon line 14—14 of Figure 2, looking in a direction opposite to that of Figure 14;
Figure 16 is a similar view with the parts in section being taken generally upon line 16—16 of Figure 2;
Figure 17 is a detail sectional elevation, taken generally upon line 17—17 of Figure 9;
Figure 18 is a similar view, the parts in section being taken generally upon line 18—18 of Figure 2;
Figure 19 is a similar view, the parts in section being taken generally upon line 19—19 of Figure 2;
Figure 20 is an enlarged view of the trip mechanism;
Figure 21 is a fragmentary sectional view of a portion of the drive mechanism, the parts in section being taken generally upon the line 21—21 of Figure 20;

Figures 22 and 23 are fragmentary detail views of portions of the trip mechanism;

Figure 24 is a detail view of a portion of the segment plate and guide plate;

Figure 25 is a plan view of the guide rails;

Figure 26 is an elevation of one of the guide rail supports and journal; and

Figure 27 is an elevation of the other guide rail support and journal.

Referring to the drawings, the reference numeral 10 indicates a threading machine or the like, which is supported upon a standard 11, and 12 is a bracket which is adjustably mounted on the threading machine through a screw 13 or the like, and held in its adjusted positions by the nut 14. The frame 15 of this feed mechanism is supported at its lower end by the links 16, each being pivotally connected with a base plate 17 by pins 19, and by pins 18 to the frame. The upper end of this frame is provided with laterally projecting trunnions 19', which are journaled in the bracket 12 and caps 20. As so mounted, adjustment of the bracket 12 automatically adjusts the relative position of the frame 15 by reason of its journal connection therewith, this movement being accommodated by the links 16. At the lower end of the frame is a bracket 21, one wall of which forms the end wall of the hopper, and journaled therein is a shaft 22 carrying a sprocket wheel 23, a bevel gear 24, and journaled therein is a bracket 146. Shaft 22 is driven by a sprocket chain 142 from the sprocket 141. Journaled in the bracket 146 is a shaft 25, having a bevel gear 26 thereon, the teeth of which mesh into those of the bevel gear 24, and upon the inner end of which is an agitator 27, which is cylindrical in form with a spiral outer edge 28.

The agitator drops by gravity to its down position, limited by the screw 70, which abuts against the bracket 21 (Figure 1). Over the opening 131 in the bracket 21, through which the agitator mechanism moves up and down, is a closure plate 71. This plate projects downwardly through the bottom of the hopper (Figure 14) and is held against the bracket 21 by the blanks in the hopper and the hopper walls 29 and 30, through which it projects (Figures 4 and 14). In the bottom of this plate is a notch 72, through which the fingers 66 pass during their travel. As these fingers are adjustable laterally with the sprocket chain 63, as hereinafter described, it is desirable that the space through which the fingers pass should be no wider than the fingers, at the same time permitting adjustment thereof. This result is accomplished by means of a swivel disk 73, which is supported in a bracket 74, fixed to the closure plate 71, and through which is a V-shape slot 75, with its narrow end adjacent to and inside of the hopper wall of the notch 72. On the swivel disk 73 are two stop pins 76, which limit the rotary movement of the disk in both directions. This disk rotates within the notch 72 in the closure plate 71 (Figure 6), and as the fingers 66 pass therethrough, entering at the wider end of the slot 75, they automatically rotate the disk 73 until the narrow end of the slot is in alignment with the travel of the fingers. Each time the fingers 66 are adjusted laterally the disk 73 is rotated slightly until it automatically adjusts itself.

To insure the open end of the slot 75 being always in the path, within the limits of the lateral adjustment, of the fingers 66, the stop pins 76 are provided.

As the agitator is rotated and moves up and down as conditions require, the hopper end is always closed, and the fingers 66, that travel through the hopper, always move through a slot only sufficiently wide to receive them, irrespective of their lateral position.

The hopper is provided with oppositely disposed walls 29 and 30, which incline downwardly and inwardly toward each other and wider at one end than at the opposite end.

The fixed wall 29 is secured to a bracket 31 upon the frame 15 and the movable wall 30 to a bracket 32 adjustable upon the frame 15 through the screw 33, or the like.

Adjacent to the hopper and in line therewith are two guide plates 34 and 35, the latter being connected with a bracket 36 fixed to the frame and the former to a bracket 37 adjustable on the frame through the screw 38, or the like, this bracket being held in any of its positions by the screw 39 or the like. These guide plates 34 and 35 flare downwardly toward each other, and outwardly away from each other at the hopper end.

Each of the brackets 36 and 37 is provided with a wall 40 outside of the plates 34 and 35 and preferably projects into a plane higher than the top thereof, thus leaving an open space between the inner face of the walls and the plates that forms an inclined trough to guide articles, that enter therein, back to the hopper.

The walls 29 and 30 are assembled so as to leave a slot 41 therebetween at their lower ends and likewise a slot 42 between the plates 34 and 35. Variation in width of these slots is determined by adjustment of the wall 30 and plate 34 through the brackets 32 and 37, respectively. This mechanism also permits an adjustment of the parts so that the width of the slots 41 and 42 may be of uniform or different widths, as may seem desirable. Each of the slots 41 and 42 is flanked by lining plates 140, preferably of harder material than the adjacent plates, to withstand wear. These are in part supported by the brackets 143 and 144.

Fixed to the upper end of each of the brackets 36 and 37 is a cheek plate 43. The chute plates 44, associated with the threading machine, are of the conventional type, and so held relatively to each other as to have an open space or slot 45 therebetween. Above this slot is a cover plate 46, adjustably supported by a bracket 47 and screw 48, or the like. These chute plates are usually so associated with the threading machine as to be movable as a unit in different parallel planes. This adjustment is accommodated and the feed mechanism adapted to operate therewith, irrespective of such adjusted positions, essentially through segment plates 49, preferably secured to the chute plates, and adjustably secured to the cheek plates 43, by the screws 50, or the like. The upper ends of the plates 34 and 35 are curved in the same radii as that of the segment plates 49 (Figure 24), so that irrespective of the adjusted position of the parts, the plates 34 and 35 occupy a tangential position relative to the segment plate 49, whereby a continuous unbroken surface is always provided, and over which the articles may be fed from the hopper to the chute.

Upon one side of the frame 15 is the drive bracket 51, and supported thereon is a drive frame 52, within which a shaft 53 is rotatably mounted, carrying a worm 54 that meshes into and drives a worm gear 55, upon a shaft 56, journaled in the drive frame 52. The shaft 53 is preferably driven by a motor mounted in a case 57, although not limited thereto. Upon the shaft 56 is a sprocket wheel 58, which is connected by a chain 59 with a sprocket 60 upon a shaft 61 journaled in the hub of the sprocket 62 and a journal block 145. On this latter shaft is a sprocket 62, connected by a chain 63 with a sprocket 64 on a shaft 65 journaled near the lower end of the frame 15 in the hub of the sprocket 64 and a journal block 145. This latter chain is provided with a plurality of spaced fingers 66, which during the rotation of the chain, travel in the slots 41 and 42. The path of travel of these fingers is such that the outer ends thereof project through the slot 41 into the hopper their maximum distance and less and less above the slots 41 and 42 as they move upwardly until near the segment plates 49 the ends of the fingers are substantially flush with the top face of said segment plates.

The chain 63 is supported between the sprockets 62 and 64 by the guide rails 67, so that it may be maintained in a predetermined position in relation to the bottom of the hopper and the guide plates 34 and 35.

The rails 67 are supported at one end by the sleeve brackets 68, mounted in the frame 15 and provide a journal for the sprocket wheels 64 and at the other end by the sleeve bracket 69 mounted within a trunnion 19' and cap 20 that provides a journal for the sprocket wheels 62. As thus mounted, the sprocket wheels 62 and 64, the guide rails 67, and the sprocket chain 63, are all adjusted laterally as a unit, and whereby the fingers 66 may always move in the center of any width slot 41 between the hopper walls.

Rotatably mounted on the shaft 56 is a sleeve 77 and keyed on the sleeve is the worm gear 55, which drives the sleeve. Fixed also on the sleeve 77 is a notched wheel or cam 78 and a ratchet wheel 79. Both the notched wheel or cam 78 and wheel 79 are provided with the same number of teeth, as shown herein five in number. By this association of parts the rotation of the worm gear 55 continuously drives the sleeve 77, notched wheel or cam 78 and ratchet wheel 79.

Secured to the shaft 56 is a disk 80 and on the outside thereof a ratchet wheel 81 is movably mounted thereon, being held against lateral movement by a plurality of screws 82, which project through slots 83 in the ratchet wheel. Thus, the wheel 81 is free to rotate upon the ratchet wheel 79 within the limits of the slots 83.

For construction purposes it is desirable that the slots 83 be rather longer than the actual operations require, and the requisite limited rotation of the ratchet wheel 81 is determined by a pin 132 fixed in the disk 80 and projecting into one of the slots 83. Thus, such relative rotation is limited in one direction by the engagement of the pin 132 with the end of a slot 83 and in the other direction by its engagement with a bolt 82.

A pawl 84 is pivotally mounted on a stud 85 in the disk 80 and moved and held in the path of the teeth on the ratchet wheel 79 by a spring 86. Outward movement of the pawl 84 is prevented by the pin 133, if perchance the spring 86 should break or become dislodged.

In the ratchet wheel 81 is a trip pin 87, which is movable in the path of the tail 88 on the pawl 84, and when in engagement therewith will swing the pawl upon its pivot mounting and the tooth thereon out of engagement with the ratchet wheel 79 whenever there is a limited counter-rotation of the ratchet wheel 81 relative to the disk 80, thus stopping the rotation of the disk 80 and shaft 56.

Journaled in the frame 15 is a rock shaft 89, upon which is fixed a stop lever 90, having a lug 91 thereon. Journaled on this shaft between the stop lever 90 and a collar 92 is a rock arm 93, carrying at one end a roll 94, which is constantly under pressure toward the periphery of the wheel 78 by the action of the spring 95. Upon this rock arm is a lug 96, through which and the lug 91, projects a bolt 97, having a spring 98 thereon between the lug 91 and the nut 99.

Keyed or otherwise secured on the shaft 89 is a crank arm 100, having a yoke block 101 associated therewith and within which is adjustably secured one end of a rod 102.

Journaled on a stud 103, near the upper end of the frame 15, is a rock lever 104, having associated therewith a swivel block 105, and within which is one end of the rod 102. Adjustably secured to the rock lever 104 by the bolts 107, is an extension arm 106.

Within a slot 108 in the outer end of the extension arm 106 is a stud 109 that is movable therein. A screw 110 engages this stud and holds it against relative outward movement, and locked in its adjusted positions by the nut 111.

Secured to one of the chute plates 44 is a finger block 112, within which is movable a trip finger 113 that is fulcrumed on a stud 114, which slides in a slot 136 on the finger block 112 and against the head of which is a tension spring 115.

A swivel block 134, pin 135, connection 116 and pin 117, connect the trip lever 113, with the rock lever 104, and receive motion therefrom.

On the cover plate 46 is a finger block 119, within which is movable a trip finger 121 that is fulcrumed on a stud 120 which slides in a slot 137 in the finger block and against the head of which is a tension spring 122.

Journaled on the stud 109 is a swivel block 123, in one end of which the trip finger 121 is pivotally connected.

The adjustability between the rock lever 104 and extension arm 106 provides means for accommodating various adjusted positions of the cover plate 46 in relation to the chute plates 44, whereby heads of blanks of various thicknesses may pass between the chute plates 44 and cover plate 46. This adjustment automatically and simultaneously accommodates the position of the trip finger 121 thereto.

The trip fingers 113 and 121 by the action of the rock lever 104 move through their several paths, four positions of each of which are shown in Figures 9 and 10.

Until interrupted, the shaft 56, disk 80, and associated parts, rotate continuously, and the rock lever 104 is actuated by the means heretofore described. When movement of the rock lever 104 is prevented by either of the means above described, the shaft 56 is held against rotation. This action results from the block 124 on the stop lever 90 being held in the path of a tooth on the ratchet wheel 81, which engages therewith and holds the roll 94 out of contact with the periphery of the notched wheel 78 and the pawl 84 is tripped through the pin 87. As soon, however, as the obstruction is removed and the rock lever 104 can continue its movement, the stop lever 90 is moved out of the path of the teeth on the ratchet wheel 81, the spring throws the pawl 84 into engagement with a tooth on the ratchet wheel 81, and the feed continues as before.

As the notched wheel 78 rotates, the cam roll 94, by reason of the pull of the spring 95, maintains contact with the periphery thereof. This imparts a rocking movement to the shaft 89, and through the connecting rod 102 a similar movement to the rock lever 104. During this rotation of the notched wheel 78 the ratchet wheel 81 rotates therewith by reason of the engagement of the pawl 84 with the teeth of the ratchet wheel 79, during which rotation the movement of the rock lever 90 causes the wearing block 124 upon said lever to move into and out of the path of the teeth on the ratchet wheel 81.

When the cam roll 94 is in the low spot between two of the teeth on the notched wheel or cam 78, the upper end of the extension arm 106 is at the uppermost end of the chute plates 44. As the extension arm is in its extreme opposite position, the cam roll is approaching the top of one of the teeth on the notched wheel or cam 78. Therefore, if the movement of the arm 104 is prevented by reason of the engagement of either of the trip levers with a blank, as before disclosed, the rock arm 93 is held in a fixed position and the block 124 engages one of the teeth of ratchet wheel 81, which now moves anti-clockwise on the disk 80. The trip pin 87 therein by its engagement with the tail 88 of the pawl 84 rocks the same upon its mounting and lifts it out of engagement with the teeth of the ratchet wheel 79. This severs the operative connection between the notched wheel or cam 78 and the disk 80. The shaft 56 is now stationary as well as the parts driven thereby. As soon as the chute is clear, the trip mechanism is released and the operations are continued as before.

When the rock lever 104 is in the position substantially as shown in Figure 9, the trip fingers 113 and 121 are in substantially the position shown in Figure 10, and designated A and E respectively in said figures. When so positioned, blanks in alignment can slide down the chutes with the heads resting upon the top thereof. As the rock arm 104 moves to the right, from the position above referred to, the trip finger 113 first rocks upon the stud 114, so that it assumes the position substantially as designated by B in Figure 10. Thereafter the continued movement of the rock arm 104 will cause the stud 114 to slide in the slot 136 against the tension of the spring 115 until it moves to the position indicated by C, which is its extreme position when actuated by the rock lever 104. As this rock lever returns to its former position the trip finger 113 first moves upon the stud 114 until it assumes the position D in Figure 10, and while in such position is drawn back to its former position ready for successive movements, as above described. When trip finger 113 is moving from the position B to C it will contact with any blank in the path thereof, and will prevent further movement of the finger. This occurs when the blanks in the slot accumulate to such an extent that the uppermost one in the chute is in the path of movement of the trip finger 113. Under such circumstances the trip lever 113 is actuated and through it the rock lever 104 and the drive and conveying mechanism come to a full stop and do not start again until sufficient of the blanks have moved downwardly in the chute to allow the trip finger to complete its cycle of operations. Thus, the feeding of blanks is stopped when a predetermined number are in the feed chute. Likewise the trip finger 121 is similarly actuated. When in the position E the rock lever 104 is in substantially the position shown in Figure 9, and the outer end of the finger is above the top of the chute plates 44. As the rock lever moves to the right, this trip finger is rocked upon the stud 120 until it assumes the position F when its outer end is in substantially the same line, or slightly above, or below the top of the chute plates. Further movement of the rock lever 104 causes this trip finger to move to the position H, during which time the stud 120 moves in the slot 137 against the tension of the spring 122. When moving from position F to H, the outer end of the finger travels in a path substantially parallel with the top of the chute plates. If it should then contact with a misaligned blank it will be held against further movement and through the rock lever 104 the drive and conveying mechanism is stopped, with the resulting stoppage of the feed of blanks until such time as the misaligned blank is removed. During the return movement of the rock lever 104 the trip finger 121 is first rocked upon the stud 120 until it occupies the position G with its outer end above the path of the blanks in the chute and maintains this position until the rock lever 104 is returned to the position substantially as shown in Figure 9, the then position of the finger being designated E.

For small work, to illustrate, with blanks having a shank approximately 2½ inches long, the slots 41 and 42 are adjusted so as to have substantially the same width and slightly wider than the diameter of the shank. In such case the shanks will fall freely into the slot in both the hopper and guides and are carried along up the incline, suspended by their heads through the travel of the fingers 66. If the shanks are longer than 2½", the parts are so adjusted that the slot 41 is less in width than the diameter of the shank, while the slot 42 is slightly wider. Thus, while in the hopper the shanks cannot drop into the slot but will when they reach the slot 42 and from there on are moved by the fingers 66 while suspended by the head. By preventing the shanks of long blanks from dropping into the slot 41, jarring and/or marring the blanks is prevented as long blanks frequently lie crosswise of each other and the slot and the weight of the mass there above have a tendency to lock and stall the feed. When they are moved out of the hopper they are relieved from the weight of the mass of blanks and no damage to the blanks or clogging of the feed can thereafter occur. Usually the alignment of the blanks is such that several blanks are presented in front of each of the fingers 66, each being suspended by the head of the blank. In case the shanks of the blanks do not fall in the slot or are otherwise carried up the incline, they drop off at the end of the guide plates 34 and 35 and are returned by gravity through the troughs inside of the walls 40 and are returned to the hopper.

For some classes of work, particularly blanks of comparatively short length, it is desirable that there should be additional means for clearing misaligned work-pieces. One form of such mechanism comprises clearance fingers 125, shown herein as four in number (Figure 12). Each finger is adjustably connected to a swinging block 126 by screws 127 or the like, mounted upon studs 128, connected with a lug 129 upon the brackets 36 and 37. These fingers are pressed inward by springs 130. The inner ends of these fingers are a sufficient distance from the slots 42 to permit the head of a blank, when properly aligned to pass thereby. If, however, the blank is crosswise or out of alignment, it will engage one or more of the clearance fingers and be thereby dislodged from its irregular position and slide downwardly toward the hopper on top of either plate 34 or 35, and as in many cases, during this movement, the shank drops into the slot without return to the hopper and the blank is carried forward by the next finger 66 in the path thereof.

What we claim as new is:

1. In apparatus of the character described; a hopper; an agitator projecting into the hopper through one end thereof, and yieldingly moved in one direction under the influence of articles within the hopper; means for positively actuating the agitator in another direction; and closure means for closing the opening in the hopper through which the agitator is projected, irrespective of the position of the agitator and movable with the agitator during the said yielding movement.

2. In apparatus of the character described; a hopper having a slot in the bottom thereof; means for varying the width of the slot; finger means traveling through said slot for taking articles from the hopper; and a closure member at one end of the hopper, through which the finger means passes during its travel, said closure member being automatically positioned by the finger means as it passes therethrough.

3. In apparatus of the character described; a hopper having a slot in the bottom thereof; means for varying the width of the slot; finger means traveling through said slot for taking articles from the hopper; means for varying the position of the finger means laterally in said slot; a closure member at one end of the hopper through which the finger means passes during its travel, said closure member having an opening therethrough, one end of which is substantially the same width as the finger means; and means for mounting said closure member, whereby its relative position will be automatically determined by the finger means as its passes therethough, irrespective of its relative position in the slot.

4. In apparatus of the character described; a hopper having a slot in the bottom thereof; means for varying the width of the slot; finger means traveling through said slot for taking articles from the hopper; a closure member at one end of the hopper through which the finger means passes during its travel and automatically positioned thereby, comprising a rotary member having a slot therethrough that is wider at one end than at the other end.

5. In apparatus of the character described; a hopper; an agitator projecting into the hopper through one end thereof, and yieldingly moved in one direction under the influence of articles within the hopper; means for positively actuating the agitator in another direction; and closure means for closing the opening in the hopper through which the agitator is projected, irrespective of the position of the agitator, comprising in part a plate slidably connected with the hopper and moved by and with said agitator.

6. In apparatus of the character described; a hopper; finger means for taking articles from the hopper; an agitator projecting into the hopper through one end thereof, and yieldingly moved in one direction under the influence of articles within the hopper; means for positively actuating the agitator in another direction; closure means for closing the opening in the hopper through which the agitator is projected, irrespective of the position of the agitator, comprising in part a plate slidably connected with the hopper and moved by and with said agitator, and having an opening in that edge thereof adjacent to the bottom of the hopper; and closure means for the last mentioned opening, comprising a rotary member mounted on said plate, and in the path of the fingers of the finger means, which pass therethrough during their travel, and automatically positioned by said fingers as they pass therethrough.

7. In apparatus of the character described; a hopper; a delivery device; a conveyor for taking articles from the hopper and moving them to the delivery device; means for actuating the conveyor; and means for stopping the motion of the conveyor actuated by engagement with an article misaligned in relation to the normal position of the articles in the delivery device.

8. In apparatus of the character described; a hopper; a delivery device; a conveyor for taking articles from the hopper and moving them to the delivery device; means for actuating the conveyor; and means for stopping the motion of the conveyor actuated by engagement with an article misaligned in relation to the normal position of the articles in the delivery device, until such article has been released from its misaligned position.

9. In apparatus of the character described; a hopper; a delivery device; a conveyor for taking articles from the hopper and moving them to the delivery device; means for actuating the conveyor; trip mechanism movable over the delivery device; a connection between the trip mechanism and the means for actuating the conveyor, said trip mechanism, actuating mechanism and conveyor coming to a full stop when the trip mechanism engages a misaligned article on the delivery device and which remains in the path of the trip mechanism.

10. In apparatus of the character described; a hopper; a delivery device; a conveyor for taking articles from the hopper and moving them to the delivery device; a drive mechanism; an operative connection between said conveyor and drive mechanism; a trip mechanism actuated by the article in the delivery device; a constant drive element; a make and break connection between the drive mechanism and drive element; and an operative connection between the trip mechanism and the make and break connection, whereby the latter is released from the constant drive element when the trip mechanism is actuated by an article in the delivery device.

11. In apparatus of the character described; a hopper; a delivery device; a conveyor for taking articles from the hopper and moving them to the delivery device; a drive mechanism; an operative connection between said conveyor and drive mechanism; a trip mechanism actuated by the article in the delivery device; a constant drive element; a ratchet and pawl connection between the drive mechanism and drive element; and an operative connection between the trip mechanism and the ratchet and pawl connection, whereby the latter is released from the constant drive element when the trip mechanism is actuated by an article in the delivery device.

12. A feed device wherein articles are in part caused to travel through a slot and arranged so that an article not so positioned may be returned to its starting point for a succeeding travel; means for stripping an article therefrom that is misaligned in relation to the slot, comprising in part a plurality of fingers upon opposite sides of said slot, yieldingly held relative to the slot, so that an article in part in said slot will pass thereby but an article not so positioned will be engaged thereby and dislodged from its misaligned position and return to its starting point for a succeeding travel, the fingers upon each side of the slot being so arranged that one is in advance of the other and if one finger is not engaged by said misaligned article and moved out of its position, a succeeding finger will engage said misaligned article, and function to dislodge the same from such misaligned position.

13. A feed device, wherein articles are caused to travel through a slot; of means for stripping an article misaligned in relation to the slot, comprising in part one or more fingers, a movably mounted block for each finger with which the same is adjustably connected; and yielding means for urging each of said blocks, to a position in which the outer end of the finger associated therewith will be adjacent to the slot.

14. A feed device, wherein articles are caused to travel through a slot; means for discontinuing such travel if an article is misaligned in relation to the slot; and means for limiting the supply of articles to the slot, such means comprising in part companion fingers yieldingly held relative to the slot, one finger being designed to initiate the discontinuance of the feed of the articles to the slot through the misaligned article and the other to limit the supply of articles to the slot.

15. A feed device, wherein articles are caused to travel through a slot; means for discontinuing such travel if an article is misaligned in relation to the slot; and means for limiting the supply of articles to the slot, such means comprising in part companion fingers yieldingly held relative to the slot, one finger being designed to initiate the discontinuance of the feed of the articles to the slot through the misaligned article and the other to limit the supply of articles to the slot, and each finger operating in a plane different than the other finger.

16. A feed device, wherein articles are caused to travel through a slot; means for discontinuing such travel if an article is misaligned in relation to the slot; means for limiting the supply of articles to the slot, such means comprising in part companion fingers yieldingly held relative to the slot, one finger being designed to initiate the discontinuance of the feed of the articles to the slot through the misaligned article and the other to limit the supply of articles to the slot; and a movable pivot for each of the fingers.

17. A feed device, wherein articles are caused to travel through a slot; means for discontinuing such travel if an article is misaligned in relation to the slot; means for limiting the supply of articles to the slot, such means comprising in part companion fingers yieldingly held relative to the slot, one finger being designed to initiate the discontinuance of the feed of the articles to the slot through the misaligned article and the other to limit the supply of articles to the slot; and means for mounting the fingers whereby they may travel in substantially straight paths and at the limits of such paths move in a rotary path.

18. A feed device, wherein articles are caused to travel through a slot; means for discontinuing such travel if an article is misaligned in relation to the slot; means for limiting the supply of articles to the slot, such means comprising in part companion fingers yieldingly held relative to the slot, one finger being designed to initiate the discontinuance of the feed of the articles to the slot through the misaligned article and the other to limit the supply of articles to the slot; and means for mounting the fingers whereby they may travel in substantially straight paths and at the limits of such paths move in a rotary path, comprising in part a movable pivot for each of the fingers.

19. In apparatus of the character described; a delivery device for guiding articles in orderly procession to a delivery station; a standard or the like; a member adjustable thereon; a hopper connected with the member and automatically movable therewith during the adjustment thereof, the hopper being in a lower horizontal plane than the receiving end of the delivery chute; a support at that end of the hopper opposite to said member that accommodates itself to the varying positions of the hopper; and a conveyor for taking articles from the hopper and transferring them to the delivery device which will maintain its relative position with the hopper during the movement of the latter, the delivery device, hopper and conveyor being so associated that the hopper and conveyor are adjustable as a unit relatively to the delivery device.

20. In apparatus of the character described; a delivery device for guiding articles in orderly procession to a delivery station; a standard or the like; a member adjustable thereon; a hopper having a hinged connection with the member and located in a lower horizontal plane than the receiving end of a delivery chute; a support at that end of the hopper opposite to said member that accommodates itself to the varying positions of the hopper; and a conveyor for taking articles from the hopper and transferring them to the delivery device, which will maintain its relative position with the hopper during the movement of the latter, the hopper and conveyor being adjustable about a common center relatively to the delivery device irrespective of the position of the latter in relation to the delivery station.

21. In apparatus of the character described; a hopper; a guide device adjacent to the hopper, the parts of the hopper and the parts of the guide device being so arranged that there is an open space between the parts of the hopper and an open space between the parts of the guide device; means for independently varying the width of the said open spaces whereby one of said open spaces may be wider than the other open space; a delivery mechanism leading from the guide device; and means traveling through both of said open spaces for taking articles from the hopper and moving them to the delivery mechanism.

22. In apparatus of the character described; a hopper; an agitator therein mounted to rotate about its axis, and to move in an arcuate path relative to a center that would be substantially intersected by a line forming an extension of the said axis; and means for actuating the agitator, whereby the same will rotate, and also move in an arcuate path relative to said center when the agitator contacts with articles within the hopper that resist rotary agitation.

23. In apparatus of the character described; a standard or the like; a bracket adjustably mounted thereon; a frame having a hinged connection with the bracket; a support for the frame, that is movable in part and spaced from the connection of the bracket with the frame; a hopper connected with the frame; a delivery device leading from the frame that may occupy various positions relative to the bracket; and a conveyor traveling through the hopper for moving articles therefrom to the delivery device, the delivery device and frame having a constant tangential relation with each other and whereby any adjustment of the bracket will cause the frame, with the hopper associated therewith, to be automatically adjusted in relation to the delivery device and thereby at all relative positions of the parts provide a continuous path for the articles to travel from the hopper to the delivery device.

24. In apparatus of the character described; a hopper; a delivery device; an element between the hopper and delivery device having a slot variable in width; a conveyor for taking articles from the hopper and moving them to the delivery device, comprising in part a chain or the like, having fingers thereon which during the travel of the conveyor pass through the hopper and said slot; a rigid support for the chain that causes the chain to move in a predetermined substantially straight line path; and means for adjusting said support laterally to the direction of the path of travel of the chain, and whereby said fingers may travel at substantially the center of said slot, irrespective of the width thereof.

25. In apparatus of the character described; a hopper; a delivery device; an element between the hopper and delivery device having a slot variable in width; a conveyor for taking articles from the hopper and moving them to the delivery device, comprising in part a chain or the like, having fingers thereon which during the travel of the conveyor pass through the hopper and said slot; a rigid support for the chain located upon one side of said slot that causes the chain to move in a predetermined substantially straight line path; and means for adjusting said support laterally to the direction of the path of travel of the chain, and whereby said fingers may travel at substantially the center of said slot, irrespective of the width thereof.

26. In apparatus of the character described; a hopper; a delivery device; an element between the hopper and delivery device having a slot variable in width; a conveyor for taking articles from the hopper and moving them to the delivery device, comprising in part a chain or the like, having fingers thereon which during the travel of the conveyor pass through the hopper and said slot; a rigid support for the chain, comprising substantially parallel rails that are inclined relatively to the top of the slot and cause the chain to move in a predetermined substantially straight line path; and means for adjusting said support laterally to the direction of the path of travel of the chain, and whereby said fingers may travel at substantially the center of said slot, irrespective of the width thereof.

27. A feed device wherein articles are in part caused to travel through a slot and arranged so that an article not so positioned may be returned to its starting point for a succeeding travel; means for stripping an article therefrom that is misaligned in relation to the slot, comprising in part one or more fingers pivotally mounted relatively to the slot with an outer free end positioned out of the path of such of the articles as are in part within the slot but positioned to engage a misaligned article and dislodge the same from its misaligned position.

28. A feed device wherein articles travel in a chute; means for controlling an orderly procession of such articles, comprising an arm, the motion of which is in part controlled by the articles, a finger having an operative and adjustable connection with the arm, one end of which travels in the path of said articles at a point distant from the delivery end of the chute a pivot member for the finger that is slidable in an independent member and supports the finger between that part thereof that travels in the path of the articles and that part thereof having connection with the arm, means for actuating the arm whereby to impart reciprocatory and rotary movement to said finger; and means to discontinue the movement of the arm when the finger engages an article which offers excessive resistance to the movement thereof.

29. A feed device wherein articles travel in a chute; means for controlling an orderly procession of such articles, comprising an arm, the motion of which is in part controlled by the articles, a finger having an operative and adjustable connection with the arm, one end of which travels in the path of said articles at a point distant from the delivery end of the chute, a pivot member for the finger that is slidable in an independent member and supports the finger between that part thereof that travels in the path of the articles and that part thereof having connection with the arm, means for actuating the arm whereby to impart reciprocatory and rotary movement to said finger; means to discontinue the movement of the arm when the finger engages an article which offers excessive resistance to the movement thereof; and a member applying friction to the aforesaid pivot to restrain the free movement thereof, and in part to cause the same to rotate at the limit of the sliding movement of the pivot.

30. In feed control mechanism; a chute to receive articles; means for limiting at the delivery end of the chute the supply of articles therein, comprising in part an element having a slot therein that is spaced from the chute, a pivot member that projects into and is movable within said slot, a rock arm, and a finger on the pivot member having a movable connection with the rock arm at one end and the other end of which travels in the path of the articles at a point distant from the delivery end of the chute, which finger, when a predetermined number of articles are in the chute, will engage the article most distant from the said delivery end and discontinue the motion of the rock arm.

31. In feed control mechanism; a chute to receive articles; means for controlling the supply of articles therein after a predetermined number of articles are adjacent to the delivery end of the chute, comprising in part, an element having a slot therein, a pivot member that projects into said slot, a finger on the pivot member, a rock arm for imparting positive movement to the finger in one direction and from which the finger in co-operation with the slotted element derives both a rotary and a longitudinal movement relative to the chute, the pivot member sliding within said slot; and a tension device in engagement with the pivot member to restrain free action of the pivot member.

RICHARD LESTER WILCOX.
WILLIAM D. RIGNEY.